July 2, 1929.  W. EISENBERG  1,719,601
MILLING MACHINE ATTACHMENT
Filed Dec. 30, 1927
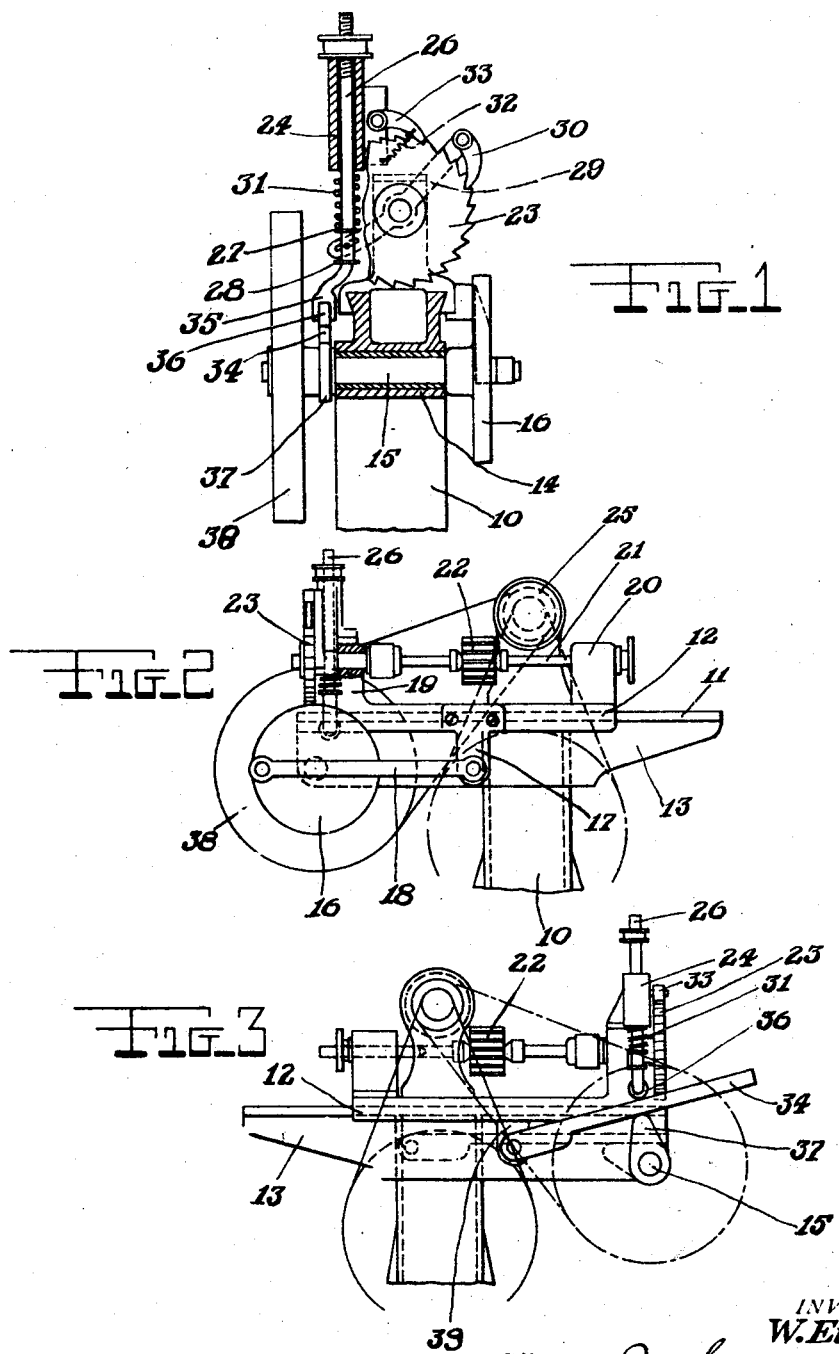
INVENTOR
*W. Eisenberg*
BY *J. Ledermann*
ATTORNEY Patented July 2, 1929.

1,719,601

UNITED STATES PATENT OFFICE.

WILLIAM EISENBERG, OF EVANSVILLE, INDIANA.

MILLING-MACHINE ATTACHMENT.

Application filed December 30, 1927. Serial No. 243,537.

The main object of this invention is to provide a dividing head for milling machines which is suitable for the various types of work required and is so constructed as to be operated in a completely automatic manner from the driving means of the device and is adapted to rotate the article a few degrees of arc at every return stroke of the carriage.

Another object of the invention is to provide an automatic dividing head which embodies a reciprocating carriage provided with a work spindle, the carriage being adapted to cooperate with an attachment which is automatically actuated by the reciprocation of the carriage and partly rotates the spindle to turn the work mounted thereon as is required in the cutting of gear teeth reamer channels or the channels of taps or for any other purpose desired.

The above and other objects will become apparent in the description below in which characters of reference refer to like named parts in the drawing.

Referring briefly to the drawing Figure 1 is a front elevational view of the dividing head showing portions thereof broken away to illustrate the construction thereof.

Figure 2 is a longitudinal side elevational view of the completely assembled dividing head.

Figure 3 is a view similar to Figure 2 looking at the dividing head from the opposite side.

Referring in detail to the drawing, the numeral 10 indicates the pedestal on which the entire device is mounted. This pedestal is surmounted by a table on which a carriage is slidably mounted. The table 11 has guide rails and the carriage lies seated thereon. The carriage, indicated by the numeral 12 consists of a rectangular plate having downwardly extending flanges at its sides. On a rib 13 rigid with the pedestal 10 a sleeve 14 is formed. The latter serves as a bearing for a shaft 15 which passes therethru and has secured to its forward end a disk 16 which is rigidly secured. Intermediate the length of the carriage 12 a lug 17 depends therefrom and its lower end is secured to a bar 18 whose opposite end is eccentrically secured to the disk 16, as is indicated in Figure 2.

A pair of spaced apart bosses 19 and 20 project upwardly from the surface of the carriage and are adapted to journal the ends of a spindle 21 upon which the work 22 is mounted. Adjacent the carriage 12 and mounted on the pedestal 10 is a cutter head which is provided with a spindle on which a gear cutter 25 or the like is adapted to be mounted. One end of the spindle 21 has a ratchet wheel 23 mounted thereon which is adapted to be actuated to rotate the spindle a few degrees of arc at a time. A lug 24 is mounted on the boss 19 and slidably receives a stud 26 which is adjustably mounted therein. The lower end of the stud has a pair of spaced apart flanges 27 and 28 formed thereon. Between these flanges one end of a lever pivoted on the spindle 21 is engaged. Said lever is indicated by the numeral 29. The opposite end of the lever 29 has a mover pawl 30 pivotally mounted thereon which engages the teeth of the ratchet 23. The upper flange 27 on the stud 26 has the lower end of a spring 31 seated thereon which yieldably urges said stud to its lowermost position. A locking pawl 33 urged into engagement by a pull spring 32 is pivotally mounted on the side of the shell and is adapted to engage the ratchet wheel and prevent reverse rotation thereof.

The lower end of the stud 26 is deformed outwardly and ends in a bifurcated extremity 35 on which a roller 36 is mounted. A lug 39 depends from the carriage and has one end of a pivoted bar 34 secured thereto upon which rides said roller 36. The shaft 15 has a cam segment 37 mounted thereon which engages the bar 34 and is adapted to lift the one end of the bar 34 and thereby actuate the stud 26.

The device is adapted to serve as an automatic dividing head which moves the spindle a predetermined degree of arc upon the return stroke of the carriage in an automatic manner. The device is driven by a wheel which is belted to the cutting head and thru a belt from the cutting head drives a wheel 38 which in turn rotates the shaft 15. On the return stroke of the carriage 12 the pivoted bar is moved toward one end of the machine and as the movement is completed the cam 37 assumes the position shown in Figure 3. This lifts the free end of the pivoted bar 34 which in turn carries the stud 26 upwardly. The stud engaging the lever 29 rotates the latter and as this stud has a mover pawl 30 pivotally mounted thereon, causes this pawl to move downwardly in an arcuate swing and while in engagement with the ratchet 23 rotates the latter a short degree of arc and thereby rotates the spindle to the same degree, which is the purpose desired.

It is to be noted that certain changes in form and construction may be made without departing from the spirit and scope of the invention.

I claim:

1. A device of the class described comprising a pedestal, a reciprocating carriage mounted on said pedestal, a spindle rotatable on said carriage, a ratchet rigid with said spindle, a lever rotatably mounted on said spindle, a pawl pivotally mounted on said lever engaging said ratchet, means for lifting one end of said lever to rotate the same comprising a stud movably mounted on the carriage engaging the lever, a cam rotatable on the pedestal, a bar pivoted on said carriage riding on said cam and movable with the carriage, said stud riding on said bar, said cam being adapted to lift said bar and stud to move said lever and rotate the ratchet.

2. In a device of the class described, a pedestal, a reciprocating carriage on said pedestal, a spindle rotatable on said carriage, a ratchet rigid with said spindle, a lever rotatably mounted on said spindle, a pawl secured to said lever engaging said ratchet to move the latter arcuately, means for lifting the free end of said lever to rotate the same comprising a stud movably mounted on said carriage engaging the lever, a cam rotatable on said pedestal and mounted in stationary position, a bar pivoted at one end on said carriage and reciprocal therewith, the free end of said bar resting on said cam, said bar supporting said stud and being adapted to lift said stud to actuate said pawl and pawl lever for arcuately rotating said ratchet.

In testimony whereof I affix my signature.

WILLIAM EISENBERG.